UNITED STATES PATENT OFFICE.

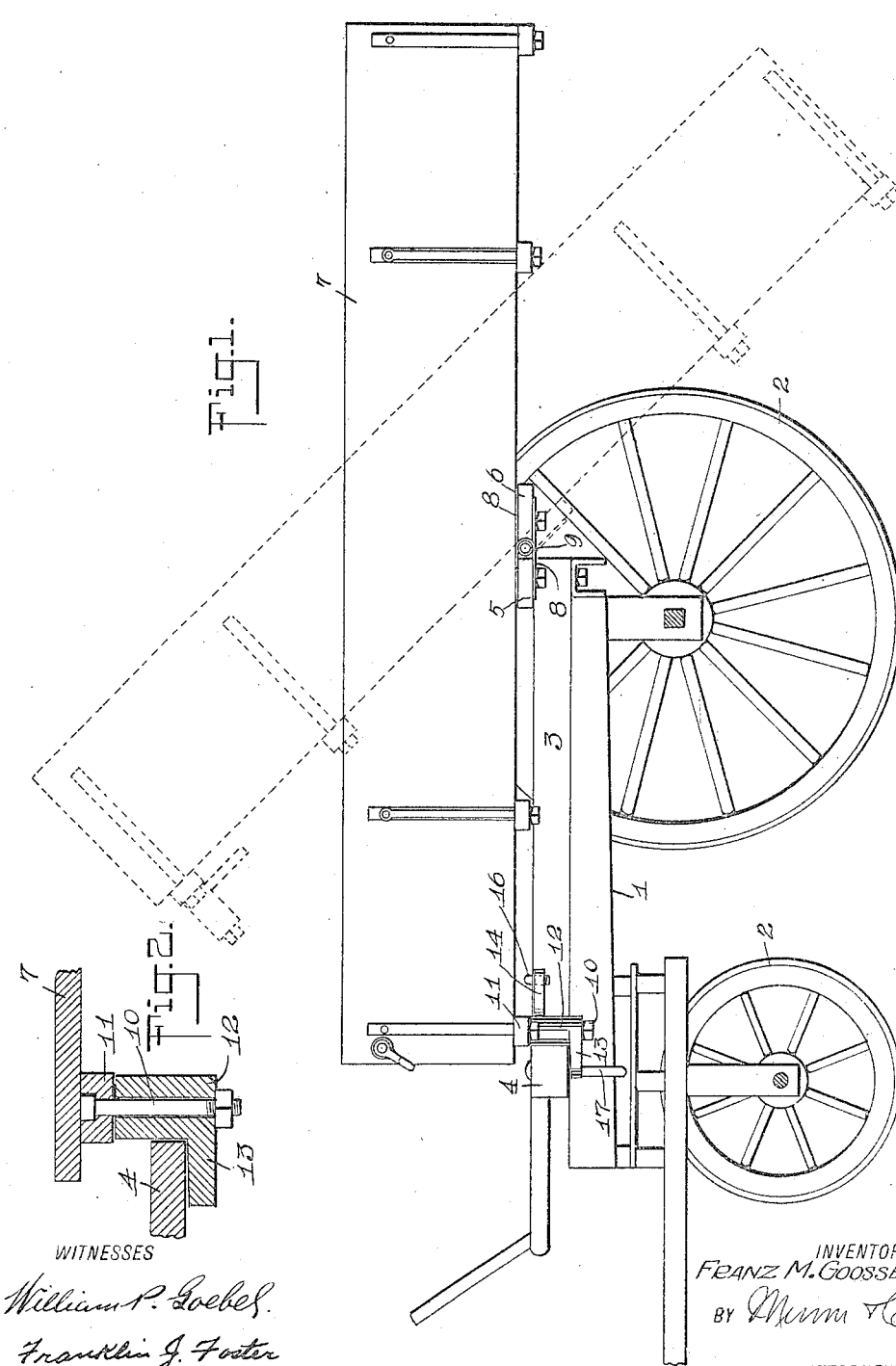

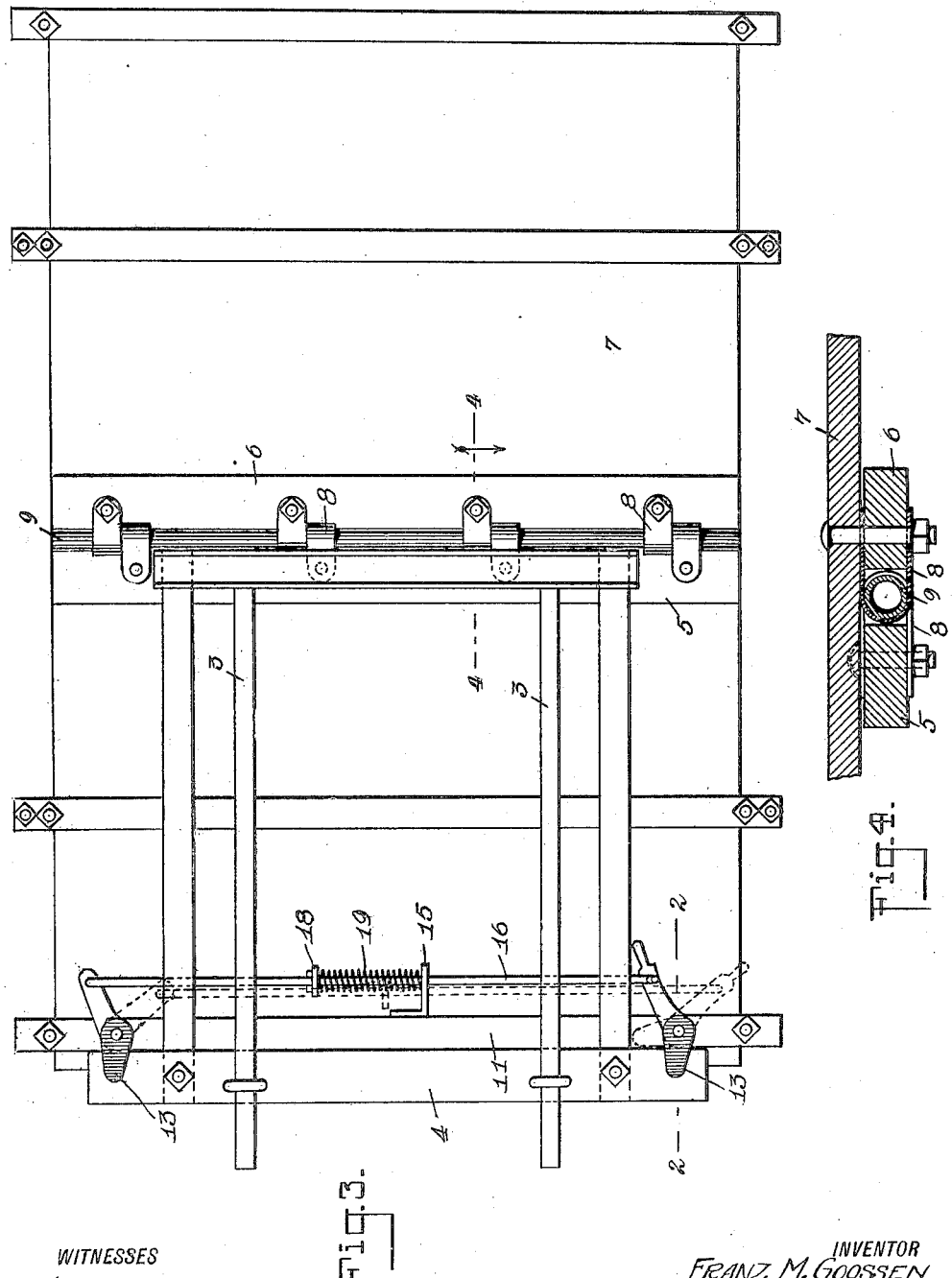

FRANZ M. GOOSSEN, OF HILLSBORO, KANSAS.

DUMPING-TRUCK.

1,377,881. Specification of Letters Patent. Patented May 10, 1921.

Application filed October 20, 1920. Serial No. 418,214.

*To all whom it may concern:*

Be it known that I, FRANZ M. GOOSSEN, a citizen of the United States, and a resident of Hillsboro, county of Marion, and State of Kansas, have invented a new and Improved Dumping-Truck, of which the following is a full, clear, and exact description.

This invention relates to improvements in dumping trucks, an object of the invention being to provide a novel way of pivoting the body to the truck.

A further object is to provide improved means for locking the body in horizontal position on the truck, and to provide a body which is suited for use with motor trucks or animal drawn vehicles.

A still further object is to provide a construction of dumping truck which will be sturdy and durable in use, simple and practical in construction, and easily manually operated.

With these and other objects in view, the invention consists in certain novel features of construction, and combinations and arrangements of parts, as will be more fully hereinafter described and pointed out in the claims.

In the accompanying drawings—

Figure 1 is a view in side elevation of my improved dumping body mounted on a wagon, the dotted lines illustrating the position of the body when the same is tipped rearwardly to discharge the contents thereof.

Fig. 2 is a fragmentary view in longitudinal section on the line 2—2 of Fig. 3.

Fig. 3 is a bottom plan view of the truck body and its associated parts.

Fig. 4 is a fragmentary view in section on the line 4—4 of Fig. 3.

I have illustrated my improved dumping body as mounted on an ordinary wagon. This however, is merely for the purposes of illustration as the body is well suited for use on various forms of automobile trucks now commonly employed.

1 represents the body supporting framework or rack of the wagon which is supported in any suitable way on the wheels 2. The rack 1 comprises a pair of longitudinal beams 3 connected at their forward ends to a cross beam 4, the ends of which extend laterally beyond the beams 3. The rear ends of the beams 3 support a cross piece 5.

The cross piece 5 is hingedly connected to a similar cross piece 6 which is bolted or otherwise secured to the underside of the wagon body 7.

To each of the cross pieces 5 and 6 are secured oppositely disposed bearing brackets 8 having alined openings to receive a rod 9 which serves to hingedly connect the two cross beams, and consequently the wagon body and its supporting framework.

The transversely positioned rod 9 is preferably located at the exact center of the wagon body 7 so that the body is perfectly balanced on its framework, and may be readily manually operated when the locking mechanism which secures the forward end of the body to the forward cross beam 4 of the rack, is released.

The locking mechanism constitutes a part of this invention and will now be described in detail. A pair of depending bolts 10 secured to the underface of the forward cross piece 11 of the wagon body, form bearings for collars 12.

These collars are located adjacent and behind the laterally extending ends of the forward cross beam 4 of the rack, and are provided with integral lugs 13 normally positioned under the cross beam 4 to prevent rearward tilting of the body 7. The collars 12 are each provided with a rigid rearwardly projecting arm 14.

A slotted bracket 15 is secured to the rear face of the cross piece 11, and a rod 16, pivotally secured at its ends to the arms 14, is movable in and through the slotted bracket 15.

An operating lever 17 is made integral with one of the collars 12 and between the bracket 15 and the other collar 12 a plate or disk 18 is fixedly mounted on the rod 16. A coil spring 19 is located around the rod between the disk 18 and the bracket 15, and tends to maintain the lugs 13 in locking position through the medium of the rod 16 and arms 14.

The operation of the device will be readily understood. When the lugs 13 are in locking position and it is desired to tilt the body 7 rearwardly to the position illustrated in dotted lines in Fig. 1, it is merely necessary for the operator to grasp the handle 17 and rotate the collars 12 on their bearings; through the medium of the rods 16 and arms 14, moving the lugs 13 to unlocked position. The locking mechanism will then be in the position illustrated in dotted lines in Fig. 3 and since the body 7 is perfectly balanced on its pivot, it may be manually tipped rearwardly.

While I have illustrated one of the preferred embodiments of my invention, it is apparent that various slight changes and alterations might be made in the general form of the parts described without departing from my invention, and hence I do not wish to limit myself to the precise details set forth but shall consider myself at liberty to make such slight changes and alterations as fairly fall within the spirit and scope of the appended claims.

What I claim is:

1. A locking mechanism for dumping trucks comprising a pair of rods depending from the forward portion of the body of the truck, collars turnable freely on the rods, lugs on the collars adapted to engage under the supporting framework of the body and prevent rearward tilting of the body, a spring held actuating means for simultaneously operating said lugs.

2. A locking mechanism for dumping trucks comprising a pair of headed bolts depending from the forward portion of the body of the truck, collars mounted to turn on the bolts, locking lugs on the collars adapted to engage under the supporting framework of the body and prevent rearward tilting of the body, means for simultaneously operating the lugs, and a spring normally holding said lugs in locking position.

3. A locking mechanism for dumping truck bodies, comprising a pair of collars rotatably mounted below the forward end of the body of the truck, forwardly extending locking lugs integral with the collars and adapted to engage under the supporting frame work of the body, rearwardly extending arms integral with the collars, a rod pivotally connected to both of the arms, a handle on one of the lugs for simultaneously operating the lugs, and a spring normally retaining the lugs in locking position.

4. A locking mechanism for dumping truck bodies, comprising a pair of collars rotatably mounted below the forward end of the body of the truck, forwardly extending locking lugs integral with the collars and adapted to engage under the supporting framework of the body, rearwardly extending arms integral with the collars, a rod pivotally connected to both of the arms, a handle on one of the lugs for simultaneously operating the lugs, a slotted bracket mounted on the body through which the rod is movable, a fixed plate on the rod, and a coil spring around the rod between the plate and the bracket normally retaining the lugs in locking position.

FRANZ M. GOOSSEN.